(No Model.)
R. E. CARROLL.
DINNER PAIL.
No. 499,628. Patented June 13, 1893.
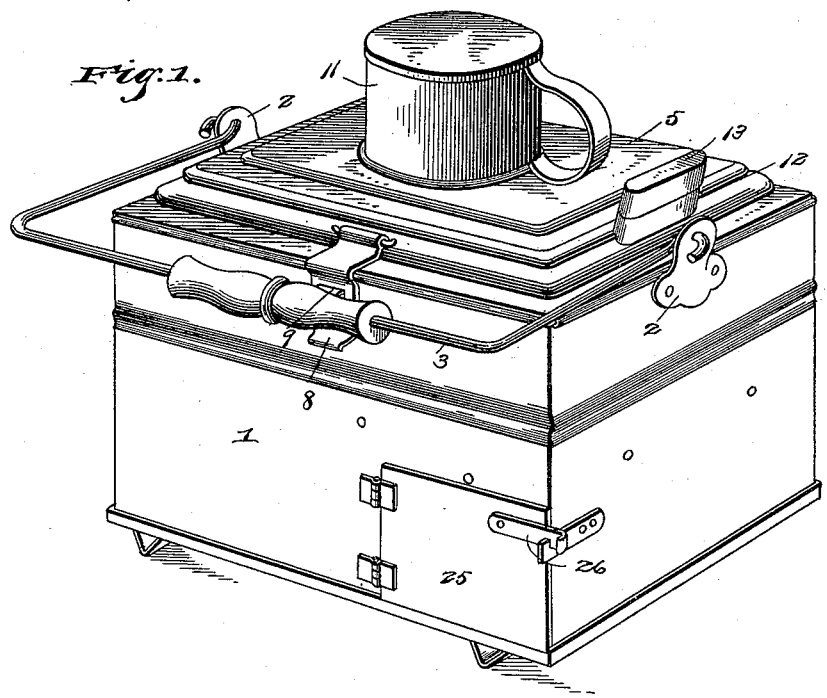
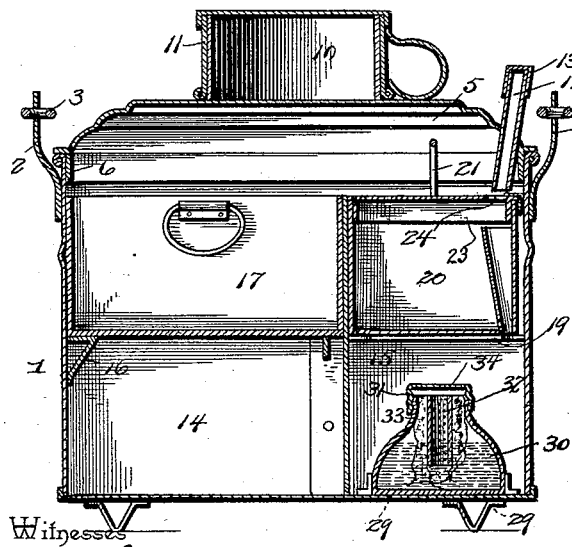
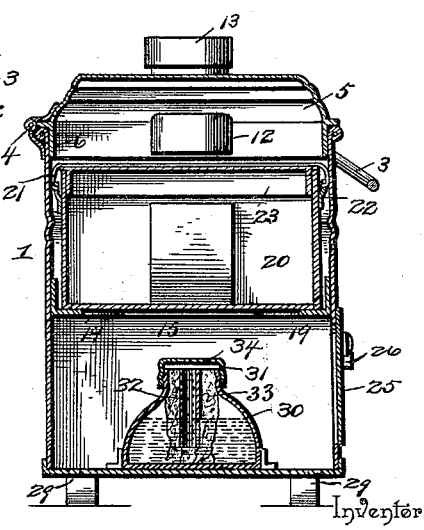

UNITED STATES PATENT OFFICE.

ROBERT E. CARROLL, OF NORTH LA CROSSE, WISCONSIN.

DINNER-PAIL.

SPECIFICATION forming part of Letters Patent No. 499,628, dated June 13, 1893.

Application filed November 8, 1892. Serial No. 451,374. (No model.)

*To all whom it may concern:*

Be it known that I, ROBERT E. CARROLL, a citizen of the United States, residing at North La Crosse, in the county of La Crosse and State of Wisconsin, have invented a new and useful Dinner-Pail, of which the following is a specification.

My invention relates to improvements in dinner-pails to be used by workingmen and others where of necessity they are compelled to carry with them their mid-day meal or dinner, and being remote from home have no facilities for heating coffee or tea, warming soup, or otherwise rendering their meals palatable.

The objects of my invention are to provide a cheap, simply constructed, and conveniently arranged pail adapted for this purpose and to overcome the objections heretofore existing, namely, to enable a person to conveniently and quickly heat tea or coffee, warm soup, or other edibles of either solid or liquid form, to make the coffee or tea fresh if desired, to obviate the commingling with the edibles of the fumes from the alcohol-lamp employed for heating purpose, and finally to so arrange the parts as to be readily accessible for cleaning.

Referring to the drawings:—Figure 1 is a perspective view of a pail constructed in accordance with my invention. Fig. 2 is a vertical longitudinal section of the same. Fig. 3 is a transverse section through the coffee receptacle and lamp.

Like numerals of reference indicate like parts in all the figures of the drawings.

The pail 1 is preferably of rectangular form in plan and is provided at opposite ends upon its upper edge with ears 2, to which are loosely connected the ends of the handle or bail 3. To the back wall of the pail there is hinged at 4 a cover 5 which is adapted to overlap the upper edge of the pail and is provided with a depending flange 6 which fits within the upper edge of the pail. A spring hasp 8 is secured to the free edge of the cover and is designed to engage over a staple 9 whereby a secure fastening is attained, and if desired, a lock may be inserted in the staple. A ring 10 surmounts the cover and over this may be placed a drinking cup 11, the latter being inverted to take over the ring and snugly fit the same, whereby the cup is maintained in position upon the pail and is accessible to the workman without the necessity of opening the pail. Near one end of the cover a pipe 12 is located, the same being provided with a removable cap 13, and the lower end of the pipe extending down into the pail a suitable distance and for a purpose hereinafter explained.

The interior of the pail is divided by means of a vertical partition into two compartments, namely, a main compartment 14 and a smaller or supplemental compartment 15. The main compartment 14 is provided at points intermediate of its height with supporting brackets 16 upon which is removably supported a pan or tray 17 sufficiently deep to receive soup or other liquid nourishments, or meats, hash, potatoes, or other vegetables. Subjacent to this pan or tray is a storing compartment in which may be placed further articles that the workman may desire to carry. Similar brackets 19 are located in the supplemental compartment, and supported upon the same is a removable coffee or tea receptacle 20 which is provided with a bail or handle 21, the ends of which are secured in outwardly standing ears 22 secured to the end walls of the receptacle. This receptacle, unlike those usually employed for the purpose named, is provided with a hinged cover 23 which may be thrown back to expose the entire interior of the receptacle, thus rendering the same readily accessible for cleansing purposes. The lid or cover 23 is provided near its free edge with an oblong opening 24, which, when the receptacle is properly arranged in the pail, registers with the flue or pipe 12, the lower end of the latter terminating adjacent to the said opening 24. Subjacent to the coffee or tea receptacle is a heating chamber in which is arranged a suitable heating device, such as a lamp, as hereinafter described, such chamber being accessible by means of a hinged door 25 provided with a latch 26. The bottom of this heating chamber is perforated, as shown at 29.

Arranged in the coffee or tea receptacle contiguous to one side thereof is a vertical tube 35 which opens at its lower end beneath the bottom of the receptacle or into the heating chamber and terminates at its upper end below and in registration with the opening 24 in the lid or cap of the receptacle.

30 designates the lamp, the same being designed to burn alcohol, and is provided with a burner 31. This burner 31 is cylindrical and is provided with an internal tube 32 leading to the interior of the lamp, the said burner and tube combining to produce an intermediate annular space in which an annular wick 33 is located. A screw-cap 34 is employed to close the lamp when not in use and confine the fumes of the alcohol therein. By the provision of the center tube, the lamp may be filled without removing the wick or burner, in fact being made integral with the lamp, if so desired. Such a construction of lamp I have found economical and convenient, and I prefer to employ the same, though other forms may be employed if desired. If desired also I may omit the door in the front wall of the pail, and would therefore, in such instance, place the lamp in position from the top removing the coffee or tea receptacle for that purpose.

This completes the construction of my improved pail, and the operation thereof will be at once obvious. It would therefore seem an unnecessary prolixity to detail all the operation of cooking and heating the dinner, and I will simply say that when the workman starts in the morning from his house to his work he places within the coffee or tea receptacle a suitable quantity of coffee or tea, and when dinner time arrives by adding water to the same and lighting his lamp and regulating his drafts, he soon produces a fresh, hot cup of the liquid.

It will be observed that the burner of the lamp is arranged directly beneath the center of the coffee or tea receptacle and that the tube 35 is arranged at one side of the compartment and hence out of alignment with the burner. Therefore, the flame from the lamp which receives its draft from directly beneath, through the perforations 29, will rise vertically and impinging against the center of the bottom of the receptacle will spread and eventually reach the lower end of the vertical tube and thence pass out through said tube and the flue or pipe 12.

I have found that the use of the side draft in a construction of this kind is impracticable, and that, in order to produce an effective application of the flame to the bottom of the receptacle it is necessary to provide a bottom draft, the exit flue being disposed out of alignment with the burner in order to prevent the heat from ascending directly therethrough without materially affecting the contents of the receptacle. It will be noted, furthermore, that by the use of brackets for the support of the coffee or tea receptacle the entire surface of the bottom is exposed to the action of the heat, and hence the preparation of the coffee or tea is expedited. The fumes arising from the lamp as well as the vapor from the coffee or tea will pass out through the flue or pipe 12 without affecting the other contents of the pail.

Having described my invention, what I claim is—

1. The combination with a containing pail provided with a suitable lid or cover, of a vertical partition located in the pail and dividing its interior into a main compartment and a supplemental compartment, brackets arranged upon the side walls of said compartments at intermediate points of their height, a tray mounted upon the brackets in the main compartment, a coffee or tea receptacle arranged upon the brackets in the supplemental compartment and having a hinged lid or cover provided with an opening 24, a flue or pipe fixed in the lid or cover of the pail and terminating at its lower end adjacent to and in alignment with the opening 24, a tube arranged vertically in said receptacle contiguous to one of its walls, the same opening at its lower end into the chamber subjacent to the receptacle and terminating at its upper end in alignment with the opening 24, and a heating device located in said subjacent chamber with its burner arranged beneath the center of the coffee or tea receptacle, the bottom or floor of such chamber being perforated to admit of a vertical draft for the heating device, substantially as specified.

2. The combination with a containing pail provided with a lid or cover and having a main and supplemental compartment separated by a vertical partition, of a coffee or tea receptacle located in the supplemental compartment and supported upon brackets secured to the side walls thereof, whereby the bottom of said receptacle is exposed, a lid or cover for the receptacle provided with an opening 24, a flue or pipe fixed in the lid or cover of the pail and terminating at its lower end in alignment with the opening 24, a vertical tube communicating at its lower end with the space below the receptacle and at its upper end in alignment with said opening 24, and a heating device arranged in the space below the receptacle with its burner out of alignment with the said tube, the floor or bottom of the supplemental compartment being perforated to supply a vertical draft to the heating device, substantially as specified.

In testimony that I claim the foregoing as my own I have hereto affixed my signature in the presence of two witnesses.

ROBERT E. CARROLL.

Witnesses:
 HUBERT DRIESEN,
 FRANK F. SCHWOEBEL.